United States Patent [19]

Teer et al.

[11] 4,018,737

[45] Apr. 19, 1977

[54] EMULSIONS OF ETHYLENE POLYMERS AND COPOLYMERS WITH CONTROLLED MOLECULAR WEIGHT AND PARTICLE SIZE

[75] Inventors: Glenn E. Teer; Jerry G. Higgins; George D. Warren, all of Big Spring, Tex.; Donald C. Ewert, Lansing, Ill.

[73] Assignee: Cosden Technology, Inc., Big Spring, Tex.

[22] Filed: Jan. 6, 1975

[21] Appl. No.: 538,919

[52] U.S. Cl. .............. 260/29.6 XA; 260/29.6 MQ; 260/29.6 ME
[51] Int. Cl.² .......................................... C08L 23/06
[58] Field of Search .............. 260/29.6 XA, 23 EM, 260/29.6 MQ, 29.6 ME, 94.9 A

[56] References Cited
UNITED STATES PATENTS

| | | | |
|---|---|---|---|
| 2,414,311 | 1/1947 | Larson | 260/94.9 A |
| 3,145,194 | 8/1964 | Heckmaier et al. | 260/94.9 A |
| 3,178,404 | 4/1965 | Vaughn, Jr. et al. | 260/94.9 A |
| 3,226,352 | 12/1965 | Helin et al. | 260/29.6 XA |
| 3,244,652 | 4/1966 | Helin et al. | 260/23 EM |
| 3,247,141 | 4/1966 | Stryker et al. | 260/23 H |
| 3,352,807 | 11/1967 | Helin et al. | 260/29.6 XA |
| 3,400,089 | 9/1968 | Bestian et al. | 260/29.6 XA |
| 3,725,378 | 4/1973 | Chamberlin | 260/94.9 R |
| 3,969,297 | 7/1976 | Teer et al. | 260/29.6 XA |

*Primary Examiner*—M. J. Welsh

[57] ABSTRACT

Stable emulsions of ethylene homopolymers and copolymers having controlled molecular weight and relatively small particle size are formed by polymerizing ethylene and/or ethylene with another alpha unsaturated monomer in an aqueous medium in the presence of a water soluble persulfate initiator, an anionic emulsifier, nonionic emulsifier or most desirable a mixture of anionic and nonionic emulsifiers and a minor but effective amount of an alkyl mercaptan having from about 4 to about 20 carbon atoms. The resulting stable emulsions exhibit improved compatibility, stability and performance when formulated in various coating compositions such as latex paints and floor polishes.

27 Claims, No Drawings

EMULSIONS OF ETHYLENE POLYMERS AND COPOLYMERS WITH CONTROLLED MOLECULAR WEIGHT AND PARTICLE SIZE

BACKGROUND OF THE INVENTION

This invention relates to emulsions of polymeric materials. In another aspect, this invention relates to novel stable emulsions formed with ethylene homopolymers and copolymers. Still another aspect of this invention relates to novel stable polymeric emulsions which are particularly suitable as prime ingredients in formulations used to coat solid materials such as latex paints and polishes.

Various polymeric emulsions are known in the art which are used in coatings, lacquers, paints, and polishes. For example, polyethylene emulsions are commonly used as the wax component in polish formulations. Eary polyethylene emulsions which were utilized in liquid emulsion polishes, for example, were made from polyethylenes which were oxygenated. Such polyethylenes were produced by telomerization of ethylene and subsequent oxidation of the telomer, or by thermal degradation of high molecular weight polyethylenes to low molecular products which are then oxidized as disclosed in U.S. Pat. Nos. 2,964,487 and 2,928,797. The hydrophilic oxygenated groups on the resulting oxidized polymeric particles allowed them to be emulsified. These emulsions rarely had a molecular weight more than about 3000 but formed smooth films when they were dried upon a surface. However, the oxygenated polyethylene materials have a disagreeable odor which taints the emulsions prepared therefrom and the products which contain such emulsions such as liquid polishes. Furthermore, these materials often have a yellow tinge.

In an attempt to form polyethylene particles in emulsion which have improved mechanical properties of toughness durability and hardness but which do not have the inherent disagreeable odor or color, emulsion polymerization processes were developed to produce relatively high molecular weight materials having relatively small particle size. Stable polyethylene latexes comprising polyethylene solids have been produced by polymerizing ethylene at elevated temperatures and pressures in an aqueous reaction medium containing an emulsifying agent and an initiator. Generally, the emulsion formed polymers have lower molecular weight than non-emulsion formed ethylene polymers produced by conventional high pressure processes but a higher molecular weight than the above described oxygenated polyethylenes.

Improved stable polyethylene emulsions which have found satisfactory use in various coatings, lacquers, paints and polishes comprise polyethylene solids of increased hardness, relatively high molecular weight, and relatively small particle size which have been produced by emulsion polymerization techniques such as set forth in U.S. Pat. Nos. 3,226,352 and 3,244,652. Examples of such polyethylene emulsions used in polish formulations are set forth in U.S. Pat. No. 3,247,141. These emulsion polymerized polyethylenes have molecular weights ranging from about 7,000 to 40,000 and particle sizes ranging broadly from around 200 angstroms to about 5000 angstroms, with the average particle size of most emulsion produced polyethylenes being 500 angstroms and greater. The use of these emulsions has eliminated the disagreeable odor and color characteristics which were inherent in the oxidized polyethylenes, and produced performance in spreading, leveling, gloss, water spot resistance, buffability and removability which is comparable to the oxidized polyethylenes. However, such conventional emulsion polmerized polyethylenes have not been utilized in as wide a variety of applications as desired because incompatibility problems exist when they are admixed with certain standard formulations of paints and polishes, causing precipitation of solids and other instability problems. Thus, there is a need for emulsions of ethylene polymers which are extremely stable and compatible with various types of latexes, admixtures, and formulations which are utilized in coating applications including paints and polishes.

STATEMENT OF INVENTION

According to the invention, improved emulsions of ethylene homopolymers and copolymers are provided having controlled molecular weight and particle size and which are compatible with other aqueous latexes. These improved emulsions are produced by a process whereby the polymerization occurs in aqueous emulsion in the presence of a water soluble persulfate initiator, an anionic or nonionic emulsifier or mixture thereof and a minor but effective amount of an alkyl mercaptan which has from about 4 to about 20 carbon atoms.

According to a preferred embodiment of the subject invention, the emulsifier system for said process comprises a mixture of anionic and nonionic emulsifiers whereby the nonionic emulsifier ranges from 5 to 75 weight percent of the total emulsifier which is utilized.

Thus, it has been found that the presence of a minor effective amount of the alkyl mercaptan during the emulsion polymerization process carried out in the presence of the water soluble persulfate initiator, and emulsifier produces an improved polymeric emulsion. Such improved emulsion exhibits increased stability and compatibility when combined with conventional coating materials as latex paints and floor polishes, and improves the performance of the resulting coating composition. More specifically, the improved emulsions will generally have finer particle sizes than are present in emulsions polymerized in the absence of the alkyl mercaptans and the stability of the improved emulsions, the performance in coating compositions, and the capability with various other aqueous latexes are markedly improved. The emulsions produced in accordance with the subject invention can be either emulsions of ethylene homopolymer or emulsions of copolymers of ethylene with another alpha unsaturated monomer. The molecular weight of the polymers produced in accordance with the process of the subject invention is controlled in the range of from about 3,000 to about 15,000 and most preferably is in the range of from about 3,000 to about 7,000. Furthermore, the average particle size of the polymer particles produced in accordance with the said invention is less than about 500 angstroms and preferably is a size in the range of from about 100 to about 250 angstroms.

DETAILED DESCRIPTION OF THE INVENTION

The improved emulsions are produced in accordance with the invention either under batch or continuous process conditions by contacting pressurized ethylene with an aqueous medium which contains a water soluble persulfate initiator, the alkyl mercaptan, and an emulsifier selected from anionic emulsifiers, nonionic emulsifiers and mixtures thereof. Ethylene polymer emulsions which can be used in polishes to form particularly durable polish coatings are produced in accordance with the subject invention by utilizing an anionic-nonionic emulsifier system which comprises from about 5 to about 75% by weight thereof of the nonionic emulsifier with the remainder being an anionic emulsifier. Contact of the ethylene with the aqueous medium is made under greater than atmospheric pressure and at an elevated temperature. Generally, the polymerization temperature can range from about 60° C to about 150° C and the pressure can generally range from about 1400 psi to about 20,000 psi depending upon whether homopolymerization, or copolymerization takes place and the type of emulsifier that is used in the system.

Generally, only a minor catalytic amount of the water soluble persulfate initiator need be present in the aqueous reaction medium. Examples of suitable persulfates include alkali metal persulfates including potassium and sodium persulfate and any other water soluble persulfate, e.g., ammonium persulfate and the like. The amount of initiator can vary depending upon whether or not homopolymerization or copolymerization of ethylene is taking place, and the particular emulsifier system which is utilized.

The alkyl mercaptan which is utilized in the process of the subject invention can be any alkyl mercaptan having the general structural formula of RSH wherein R can be any straight or branched chain alkyl radical having from about 4 to about 20 carbon atoms. Examples are normal-dodecyl mercaptan and tertiary-nonyl mercaptan. The preferred alkyl mercaptans have an alkyl group of at least 10 carbon atoms and at least one branch in the chain. The most preferred alkyl mercaptan utilized in the scope of the subject invention is tertiary dodecyl mercaptan.

Examples of other suitable mercaptans which can be used in the scope of the invention include:
Dithiobis(benzothiazole)
Benzyl Mercaptan
p-Chlorobenzyl Mercaptan Generally, the alkyl mercaptan can be present in the aqueous composition in an amount in the range from about 0.1 to about 1 weight percent thereof and preferably from about 0.1 to about 0.5 weight percent thereof. It must be noted that the type of alkyl mercaptan as well as the amount of such alkyl mercaptan utilized in the aqueous medium is dependent upon the ultimate molecular weight and particle size of polymer which is desired in emulsion. For example, greater amounts of alkyl mercaptans which have an alkyl group below about 10 and no branching in the chain, will be necessary in order to produce smaller molecular weight and particle size of polymer in emulsion than when the preferred alkyl mercaptans are used.

Suitable anionic emulsifiers which can be used in the scope of the subject invention include the saturated fatty acid salts, such as the alkali metal salts and particularly the sodium and potassium salts of saturated fatty acids having from about 12 to about 18 carbon atoms. Examples of suitable such emulsifiers include the alkali metal salts of myristic acid, lauric acid, stearic acid and the like.

Other suitable anionic emulsifiers which can be used in the scope of the subject invention include the alkali metal salts and particularly the sodium and potassium salts of alkyl aryl sulfonic acids and preferably the alkali metal alkyl benzene sulfonates wherein the alkyl group is a straight or branched chain group which contains from about 6 to about 18 carbon atoms. Examples of suitable such materials include sodium and potassium salts of dodecyl benzene sulfonic acid, nonyl benzene sulfonic acid, undecyl benzene sulfonic acid, tetradecyl benezene sulfonic acid, hexadecyl benzene sulfonic acid, mixtures thereof and the like.

Further anionic emulsifiers which can be used in the scope of this invention include the salts and particularly the alkali metal salts of sulfates of fatty alcohols having from about 12 to about 18 carbon atoms or mixtures thereof and salts and particularly alkali metal salts of sulfates of ethoxylated fatty alcohols having from between about 12 to about 18 carbon atoms and an average number of ethoxy groups between about 1 and 5. Examples of such materials include sodium sulfates of $C_{12}$ alcohols, sodium tridecyl alcohol sulfate, and the sodium salt of ethoxylated lauryl sulfate with an average of about 1.5 groups.

When utilizing the anionic emulsifiers and particularly the acid salts, the pH of the reaction should be maintained within the range of from about 8.5 to about 14 by the use of basic materials such as sodium hydroxide or potassium hydroxide.

In addition, especially when using the acid salts particularly the saturated fatty acids having about 12 to 18 carbon atoms, a pH adjuster can be present in the aqueous phase to prevent displacement, by stronger acids, of the weak component of the emulsifier, e.g., fatty acid soaps. The pH adjusters employed in this instance are those which in nature and amount used will result in a pH at least about 8.5 in the product removed from the reactor. Since acid is formed during the polymerization, the pH at the time polymerization is initiated is preferably somewhat higher, suitably about 10.5. Alkaline substances having a pH of about 10.5 for example, are potassium phosphates such as tripotassium phosphate and potassium carbonate, which substances are also buffers. To give the desired pH values tricalcium phosphate, for example, is added to the aqueous medium in amounts between about 0.25 and about 0.7% by weight thereof. To maintain the pH, buffering alkalies such as potassium hydroxide or sodium hydroxide can be added to the aqueous medium during the course of the reaction. Furthermore if the alkyl sulfate type emulsifiers are utilized, the pH adjuster can be omitted since these materials are acid stable to a pH of about 4.

Nonionic emulsifiers which can be used in the scope of this invention are the nonionic alkylphenoxy polyoxyethylene ethanols and preferably the alkylphenoxy polyoxyethylene ethanol emulsifiers having the general formula:

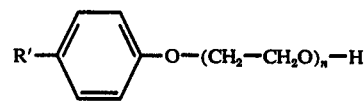

Wherein R' is an alkyl chain having 8 or 9 carbon atoms advisably branched such as a polypropylene or polybutylene chain and n represents an average of 7 to about 15. Some examples of suitable such emulsifiers are as follows:

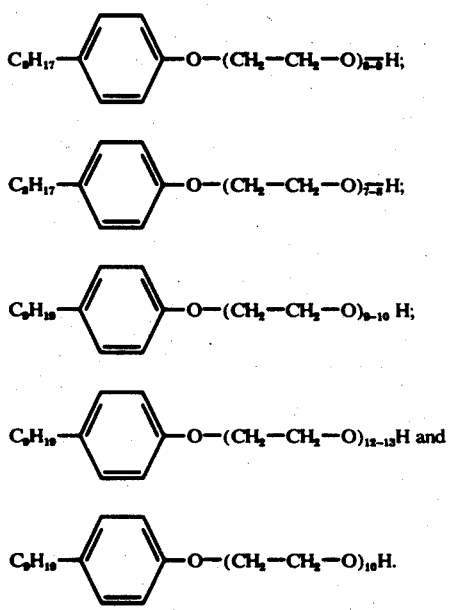

When polymerizing ethylene alone, and utilizing the above described alkyl aryl sulfonate salts as emulsifiers, the polymerization is preferably carried out in the presence of a water soluble persulfate initiator in an amount in the range of from about 0.1 to 0.75% by weight of the initiator based upon the liquid reaction medium. Furthermore, the emulsifier should be present in an amount in the range of from about 1 to 7% by weight of the aqueous reaction medium and more preferably from about 3 to about 5% by weight of the aqueous reaction medium. The reaction can occur at a pressure in the range of from about 1500 to about 4,500 psi and preferably in the range from about 1,550 to about 3,000 psi. The process can be carried out at a temperature in the range of from about 70 to 110° C and preferably from about 85° to 95° C.

Likewise, when polymerizing ethylene alone and utilizing the above-described salts of saturated fatty acids or salts of sulfates of fatty alcohols or salts of sulfates of ethoxylated fatty alcohols as emulsifiers, it is generally desirable to conduct the process with a polymerization initiator content in the range of from about 0.06 to about 0.75 percent by weight of the aqueous phase. Furthermore, the emulsifier should be present in an amount in the range of from about 0.9 to about 9 percent by weight of the aqueous phase and even more preferably, an amount in the range of from about 1.2 to about 3.0 percent by weight of the aqueous phase. Furthermore, the emulsion polymerization can be carried out at a temperature within the range of from about 70° to about 100° C and even more preferably at a temperature in the range of from about 80° C to about 90° C. Furthermore, this process can be carried out at a pressure in the range of from about 2,000 to about 5,000 psi and preferably at a pressure in the range of from about 3,000 psi to about 4,000 psi.

When utilizing the above-described nonionic emulsifiers to polymerize ethylene alone, the reaction is preferably carried out in the presence of the free-radical initiator in an amount in the range of from about 0.08 to about 0.50 percent by weight of the aqueous medium. The emulsifier can be present in the range of from about 1.0 to about 5.0 percent by weight of the aqueous medium and more preferably in an amount in the range of from about 2.0 to about 4.0 percent by weight of the aqueous medium. The polymerization can be carried out at a temperature within the range of from about 60° C to about 150° C and more preferably at a temperature in the range of from about 80° C to about 100° C. Furthermore, the pressure can be in the range of from about 2,000 psi to about 20,000 psi and is preferably within the range of from about 2,500 to about 4,500 psi.

When using a mixture of the anionic and nonionic emulsifiers which comprises from about 5 to about 75% by weight of nonionic emulsifier within the preferred embodiment of the subject invention, the emulsifier mixture can be present in the range of from about 1 to about 9 percent by weight of the aqueous medium. Furthermore, the initiator can be present in an amount in the range from about 0.06 to about 0.75 weight percent of the aqueous emulsion and the reaction can be carried out at a temperature within the range of from about 80° C to about 100° C and a pressure in the range of about 2,000 to about 3,000 psi.

In addition, the ethylene can be copolymerized with another alpha unsaturated monomer. The other alpha unsaturated monomer can comprise from 1 to about 25 weight percent of the resulting copolymer. The other alpha unsaturated monomer can either be introduced as gas with the ethylene or the other monomer can be present with the aqueous solution when the ethylene contacts the aqueous solution. Examples of alpha unsaturated monomers which can be used in the scope of the subject invention include alkyl vinyl compounds having from about 3 to about 24 carbon atoms; vinyl organic acids such as acrylic acid, methacrylic acid, itaconic acid; alkyl acrylate esters such as methacrylate, butylacrylate, and methylmethacrylate; acrolein; acrylonitrile; a styrenic compound such as styrene, alpha methylstyrene, 2-chlorostyrene, 4-chlorostyrene and vinyl toluene; a disubstituted olefin such as maleic anhydride, maleimide, N-methylmaleimide, N-ethylmaleimide, diethylmaleate, maleic acid, vinylene carbonate, and sodium maleate; vinyl esters such as vinyl acetate, vinyl butyrate, vinyl propanate, ethyl vinyl ether, and isopropenylacetate and the like; and vinyl halides such as vinyl chloride, vinylidene chloride, 2-chloroethyl acrylate, 4-chlorobutylacrylate, 2-bromoethyl methacrylate, 2-chloroethyl methacrylate, 4-chlorobutyl methacrylate, 2-bromoethyl methacrylate, bis-beta chloroethyl vinyl phosphonate and the like.

Generally, when the ethylene is copolymerized in the presence of another polymerizable monomer, greater amounts of initiator can be utilized than when ethylene is polymerized alone. For example, with all of the emulsifiers set forth above, the initiator amount can be as high as 1 weight percent of the aqueous emulsion. In addition, the temperature of polymerization can be as high as 150° C when utilizing all of the emulsifiers which are set forth above. In addition, if the polymerizable monomer has an acid group thereon which can inherently function as an emulsifier, lesser quantities of the emulsifier can be utilized, if desired. For example, when the acrylic type monomer is copolymerized with ethylene, a satisfactory range of emulsifier either anionic, nonionic or mixtures thereof can be in the range of from about 0.6 to about 6.0 weight percent of the aqueous emulsion which is utilized.

Although the polymerization can be readily effected in the presence of water as the sole liquid medium, an alcohol such as t-butanol can be included within the aqueous medium. The presence of such an alcohol is especially preferred when the sole emulsifier is a nonionic emulsifier. Such aqueous alcoholic medium can contain any amount of alcohol of the type that favorably influences the polymerization and the resultant emulsion. Generally up to about 35 percent by weight based on the combined weight of alcohol and water of an alcohol such as t-butanol can be acceptably included in the polymerization medium.

The reaction can be carried out in either a batch or continuous operation. In carrying out the polymerization process in accordance with the present invention, water, the alkyl mercaptan, the emulsifier, the initiator, the pH adjuster (if necessary), and another nonvaporous monomer (if desired) are combined in any order in the amounts or proportions which are recited above. The components are mixed in a suitable pressure reactor, or a premixed aqueous phase is introduced into the suitable aqueous reactor. The reactor is equipped with a stirring mechanism in which fairly vigorous agitation of the contents is possible either by motion of the reactor or by agitating means of the reactor. The reactor is suitably made of a corrosion resistant material such as stainless steel or is equipped with a corrosion resistant lining such as glass or stainless steel. The reactor is then flushed with polymerization grade (99.8+% pure) ethylene to remove gaseous oxygen from the system. Preferably the polymerization grade ethylene contains less than 10-25 ppm of oxygen.

In some instances, it is desirable to initially add all ingredients but the initiator to the reactor and then heat the reactor to the operating temperature as set forth above, and then the initiator is introduced into the reactor, conveniently dissolved in a portion of the water component of the aqueous medium. In this instance, the initiator is conveniently added to the reaction zone in a sufficient quantity to produce a polymerization rate of about 5% per hour.

High pressure polymerization grade ethylene (and, if desired, other vaporous monomer) is introduced into the reactor. The pressure of the ethylene can be dependent upon the emulsifier as stated above. The reaction proceeds at the temperatures and pressures set forth above with constant vigorous agitation of the liquid contents of the reactor. As the polymerization proceeds, additional ethylene is continuously fed into the reactor to maintain the pressure. The polymerization is permitted until the emulsion reaches the desired solids content. This can be done by periodically withdrawing samples from the reactor and plotting the solids content as a function of time. A leveling off of the plotted solids content indicates that the reaction is slowing down and that the initiator is becoming depleted by thermal decomposition. When this happens, additional initiator can be added in small increments to maintain the polymerization rate of about 5% per hour. The emulsion produced will generally have a solids content of between about 15 and 25 weight percent.

Following the polymerization any solvent present such as t-butanol can be stripped from the latex and the latex concentrated by distillation under reduced pressure until the solids content is up to about 45 weight percent without adverse effect on the stability of the emulsion.

The resulting stable emulsions produced by the subject invention are unexpectedly compatible with conventional polish and paint formulations and contribute to improved properties of these compositions.

It has been found that the improved ethylene polymer and copolymer emulsions produced in accordance with the subject invention can be incorporated into conventional latex paint formulations to produce a resulting composition with improved scrub resistance, color acceptance and development, flow, leveling, and brushing without affecting the gloss of the paint. Typical such latex paint formulations include both the gloss and semi-gloss latexes of acrylic polymers, copolymers, esters and polyvinylacetate and styrene-butadiene copolymers, for example. The typical latex paint formulation will contain a dispersing agent for pigments such as tetrasodium pyrophosphate, soya lecithin and the like; protective colloids and thickeners such as sodium polyacrylates, carboxymethylcellulose, colloidal clays, gum arobic, and the like; defoamers such as tri-n-butylphosphate, n-alkylalcohol, and other higher alcohols and the like; coalescing agents which include hexylene glycol and ethylene glycol, monobutyl ether acetate and the like; freeze-thaw additives such as, e.g., ethylene glycol; mildewcides and preservatives such as mercurial copper and phenolic compounds; and pH controllers such as ammonium hydroxide. The ethylene emulsion produced in accordance with the subject invention can be incorporated into typical conventional formulas in amounts equaling from about 1 to about 20 weight percent thereof.

In addition, the ethylene polymer emulsions of the subject invention can be incorporated into conventional polishes such as floor polishes which basically comprise aqueous emulsions. Liquid aqueous emulsion polishes generally comprise a waxy component and a resin component, including alkali soluble and alkali insoluble components, and leveling and plasticizing agents and fluxes. Depending on the characteristics desired in the final polish, the dispersed waxy and resinous component can be employed in proportions that constitute between about 5 and about 95% by weight of the total solids dispersed. Polyethylene emulsions have been utilized as the total or a part of the total of the waxy component. The conventional waxy components include natural and synthetic waxes.

A wide variety of alkali soluble and alkali insoluble natural and synthetic resins are known in the polish formulating art, including rosin, shellac, manilla, loba, terpene resins, terpene phenolic resins, polyvinylacetate, polyvinylchloride, polystyrene, polyvinylidene chloride, copolymers of vinyl chloride, and vinyl acetate, copolymers of vinylidene chloride and acrylonitrile, vinyl acetate and crotonic acid copolymers, butadiene-styrene copolymers, condensation products of maleic or fumaric anhydride with rosin and mixed polyhydroxy alcohols, condensation products of maleic anhydride and pentaerythritol, condensation products of maleic anhydride and high molecular weight glycols, and polymers and copolymers of alkyl acrylates and methacrylates. These resins can also be polymers of allyl acrylate, methallylacrylate, allyl methacrylate, crothyl acrylate, crotylmethacrylate, allyl methacrylate, allyl cinnamate, methallylmethacrylate, methallylacrylate, diallyl phthalate, dimethallyl phthalate, diallylmaleate, divinylbenzene, and the like.

Suitable leveling agents, plasticizers or fluxers known to the art for use in wax polish formulations include phthalate plasticizers such as dibutylphthalate, alkylphosphate plasticizers such as tributylphosphate or tributyloxyethylphosphate, n-octanol and fluoroalkyl leveling agents taught in U.S. Pat. No. 2,937,098. The ethylene polymer emulsions of the subject invention are more compatible than conventional polyethylene emulsions with the above described polish formulations and also exhibit increased scuff and scratch resistance, slip resistance, gloss, black heel mark resistance, durability and stability without effecting detergent resistance and removability.

The following examples are set forth to better facilitate the understanding of this invention and are not intended to limit the scope thereof:

EXAMPLE I

A 2,000 gallon high pressure stainless steel reactor was charged with the solution containing 96.4% by weight deionized water, 3% by weight of dodecyl benzene sulfonic acid, 0.4% by weight of potassium persulfate, 0.2% by weight of tert-dedecyl mercaptan, and 0.5% by weight of sodium hydroxide. The reactor was flushed, sealed and heated to 85° C and pressurized to 2,200 pounds per square inch with polymerization grade ethylene containing less than 25 ppm of oxygen. The pressure was maintained in the interior of the reactor by means of an automatically operated control valve supplying ethylene from a compressor. The temperature was also automatically maintained at a constant level of 85° C by means of a thermostat and internal cooling coils. The reaction began immediately and reaction samples were removed from the reactor at 30 minute intervals after the initiation began. The solids content of the samples were determined by means of moisture balance. When the solids level of the samples reached 17.5 weight percent the polymerization was terminated by shutting off the ethylene supply, and cooling the reactor, and the agitators were stopped. The contents of the reactor were discharged into a receiving vessel at atmospheric pressure. The total reaction time was 2.5 hours. The resulting product was a translucent latex with no sediment or visible solid particles present. The molecular weight range of the latex was from 3,000 to 8,000 and the average particle size was 250 angstrom units. The latex showed no gelling, creaming or thickening after 8 months storage.

EXAMPLE II

An aqueous feed solution comprising 96.4 weight percent deionized water, 3 weight percent of dodecyl benzene sulfonic acid, 0.4 weight percent potassium persulfate, 0.2 weight percent tert-dodecyl mercaptan, and 0.5 weight percent sodium hydroxide was continuously fed to a 2000 gallon stainless steel reactor which was maintained at 85° C and a pressure of 2,200 psi by ethylene. The reaction product was constantly withdrawn from the reactor at a rate to maintain a residence time of 2.5 hours and a solids level in the product of 17.5 weight percent. The product was evaporated to a solids level of 40 weight percent. The physical properties of this product were similar to those described in Example I and the product showed no gelling, creaming or thickening after 6 months storage.

EXAMPLE III

Using the reactor described in Example I, a solution containing 93.6 weight percent deionized water, 3.2 weight percent dodecyl benzene sulfonic acid, 0.4 weight percent potassium sulfate, 0.2 weight percent tert-dodecyl mercaptan, and 1.6 weight percent sodium hydroxide, and 2.0 weight percent acrylic acid was charged thereto. The reactor was heated to 95° C and pressurized to 2,500 psi with ethylene. The temperature and pressure were controlled at these levels in the same manner as described in Example I. The reaction began immediately and reaction samples were removed at 30 minute intervals after initiation was begun. The solids content of the samples was determined by means of a moisture balance. When the solids level reached 17.5% the polymerization was terminated and the reactor contents were discharged into a receiving vessel at atmospheric pressure. The total reaction time was 2.5 hours. The product was a translucent stable latex with no sediment or visible solid particles present. The molecular weight range was from 3,000 to 8,000 and the average molecular size was 200 angstrom units.

EXAMPLE IV

An aqueous feed solution comprising 93.6 weight percent deionized water, 3.2 weight percent dodecyl benzene sulfonic acid, 0.4 weight percent potassium persulfate, 0.2 weight percent tert-dodecyl mercaptan, 1.6 weight percent sodium hydroxide and 2 weight percent acrylic acid was continuously fed to a 2,000 gallon stainless steel continuous reactor for a period of 24 hours with a temperature maintained at 95° C and pressure maintained at 2,500 psi by ethylene. The product was continuously withdrawn from the reactor over the 24 hour period at a rate to maintain the residence time of 2.5 hours and a solids level in the product of 17.5% by weight. The product was evaporated to a solids level of 40 weight percent. The product was a translucent, stable latex with no sediment or visible particles present. The product had a molecular weight range of from 3000 to 8000 and an average particle size of 200 angstrom units.

EXAMPLE V

Using the 2,000 gallon high pressure stainless steel reactor described in Example I, a solution of 92.15 weight percent deionized water, 3.5 weight percent dodecyl benzene sulfonic acid, 0.25 weight percent nonyl phenol polyethylene oxide, containing 9 to 40 ethylene oxide units, 0.5 weight percent of potassium persulfate, 0.2 weight percent tert-dodecyl mercaptan, 1.4 weight percent of sodium hydroxide, and 2.0 weight percent acrylic acid was charged thereto. The reactor was pressurized with 2100 pounds per square inch of ethylene and heated to a temperature of 95° C. The temperature and pressure were maintained at these levels within the reactor in the same manner as described in Example I. Reaction samples were removed at 30 minute intervals after initiation began. The solids contents were determined by the same method as disclosed in Example I and when the solids level reached 17.5 weight percent of the sample, the polymerization was terminated and the reactor contents discharged in the same manner as explained in Example I. The product was a translucent, stable latex with no sediment or visible particles present. The molecular weight range was from 3,000 to 8,000 and the particle size was in the range of from 150 to 200 angstrom units.

EXAMPLE VI

An aqueous feed solution comprising 92.15 weight percent deionized water, 3.5 weight percent dodecyl benzene sulfonic acid, 0.25 weight percent of nonyl phenol ethylene oxide containing 9 to 40 ethylene oxide units, 0.5 weight percent potassium persulfate, 0.2 weight percent tert-dodecyl mercaptan, 1.4 weight percent sodium hydroxide, and 2.0 weight percent acrylic acid was continuously fed to a 2000 gallon stainless steel continuous reactor for 24 hours. The reactor was operated at a temperature of 95° C and at a pressure of 2100 psi by ethylene. The product was continuously withdrawn at a rate to maintain a constant residence time of about 2.5 hours and to yield a product containing 17.5 weight percent solids. The individual product was evaporated to yield a concentrated product containing 40 weight percent solids. The product had a molecular weight range of from 3,000 to 8,000 and particle size in the range from 150 to 200 angstrom units. The latex was a translucent stable latex with no sediment or visible solid particles present.

EXAMPLE VII

The 2,000 gallon high pressure stainless steel reactor described in Example I was charged with a solution containing 92.0 weight percent deionized water, 3.0 weight percent dodecyl benzene sulfonic acid, 1.0 weight percent of nonyl phenol ethylene oxide containing 9 to 40 etbylene oxide units, 0.5 weight percent of potassium persulfate, 0.2 weight percent of tert-dodecyl mercaptan, 1.4 weight percent sodium hydroxide and 2.0 weight percent acrylic acid. The reactor was operated at 95° C and the interior of the reactor was pressurized at 2100 psi by ethylene in the same manner as was described in Example I. The reaction began immediately and proceeded for 2½ hours until the solids content within the reactor was 17.5 weight percent. The resulting product was a translucent stable latex with no sediment or visible solid particles present. The polymer had a molecular weight in the range from 3,000 to 8,000 and the particle size of the polymer was in the range of from 150 to 200 angstrom units.

EXAMPLE VIII

An aqueous feed solution comprising 92.0 weight percent deionized water, 3.0 weight percent dodecyl benzene sulfonic acid, 1.0 weight percent nonyl phenol ethylene oxide containing 9 to 40 ethylene oxide groups, 0.5 weight percent potassium persulfate, 0.2 weight percent tert-dodecyl mercaptan, 1.4 weight percent sodium hydroxide, and 2.0 weight percent acrylic acid was continuously charged to a 2,000 gallon stainless steel continuous reactor for a period of 24 hours. The reactor was operated at a temperature of 95° C and a pressure of 2,100 psi by ethylene which was continuously supplied thereto. A product was continuously removed from the reactor at such a rate that it had a residence time of 2.5 hours and the resulting solids had a content of 17.5 weight percent. The product emulsion was a translucent stable latex with no sediment or visible particles present. The polymer had a molecular weight in the range from 3,000 to 8,000 and a particle size in the range from 150 to 200 angstrom units.

EXAMPLE IX

The reactor described in Example I was charged with a solution containing 91.25 weight percent deionized water, 5.0 weight percent tert-butylalcohol, 3.2 weight percent nonyl phenol ethylene oxide containing 9 to 40 ethylene oxide units, 0.3 parts by weight potassium persulfate, 0.05 parts by weight potassium hydroxide, and 0.2 weight percent tert-dodecyl mercaptan. The reactor was heated to 95° C and pressurized to 2500 psi with ethylene and the reaction was carried out for 2.5 hours using the same basic procedure as set forth in Example I. The resulting polymer was an opaque slightly translucent stable latex wherein the polymer particles had a molecular weight range of from 6,000 to 10,000 and a particle size in the range of from 250 to 500 angstrom units.

EXAMPLE X

An aqueous feed solution comprising 91.25 weight percent deionized water, 5.0 weight percent tert-butylalcohol, 3.2 weight percent nonyl phenol ethylene oxide containing 9 to 40 ethylene oxide units, 0.3 weight percent potassium persulfate, 0.05 weight percent potassium hydroxide, and 0.2 weight percent tert-dodecyl mercaptan was continuously charged to a 2,000 gallon stainless steel continuous steel reactor for a period of 24 hours which operated at a temperature of 95° C and an ethylene pressure of 2,500 psi. The product was continuously removed from the reactor at a rate such that the average residence time was 2.5 hours and the product had a solids content of 17.5 weight percent. The product was concentrated to a solids content of 40 weight percent and the product was an opaque slightly translucent stable latex which had a molecular weight in the range of 6,000 to 10,000 and a particle size in the range from 250 to 500 angstrom units.

EXAMPLE XI

The reactor as described in Example I was charged with a solution comprising 87.4 weight percent deionized water, 3.2 weight percent nonyl phenol ethylene oxide containing 9 to 40 ethylene oxide units, 5.0 weight percent tertbutylalcohol, 2 weight percent acrylic acid, 5 weight percent t-butylalcohol, 0.2 weight percent tert-dodecyl mercaptan, and 1.7 weight percent potassium hydroxide. The reactor was operated at a temperature of 100° C and maintained at a pressure of 2,500 psi with ethylene in a manner described in Example I. Reaction was carried out in the same manner as described in Example I for a 2.5 hour period until the solids had a content of 17.5 weight percent. The product was a stable slightly translucent emulsion having a molecular weight in the range of from 4,000 to 8,000 and a particle size in the range of from 100 to 250 angstrom units.

EXAMPLE XII

An aqueous feed solution comprising 87.4 weight percent deionized water, 3.2 weight percent nonyl phenol ethylene oxide containing from 9 to 40 ethylene oxide groups, 5 weight percent tert-butylalcohol, 2 weight percent acrylic acid, 0.5 weight percent potassium persulfate, 0.2 weight percent of tert-dodecyl mercaptan, and 1.7 weight percent potassium hydroxide was continuously fed to a 2,000 gallon stainless steel continuous reactor for 24 hours. The reactor was maintained at a temperature of 100° C and at a pressure of 2,500 psi by constant supply of ethylene thereto. The product was withdrawn continuously from the reactor so that it had an average residence time within the reactor of 2.5 hours and a solids content of 17.5 weight percent. The resulting product was stripped to a solids content of 40 weight percent. The product was a very stable emulsion having a slightly translucent appearance with a molecular weight range of from 4,000 to 8,000 and a particle size range of from 100 to 250 angstrom units.

EXAMPLE XIII

The polyethylene emulsion produced by Example XII was formulated with a semi-gloss acrylic latex paint. The formulation of the acrylic latex paint is shown in Table 1 below:

Table 1

| Component | Weight Percent |
|---|---|
| Pigment Dispersion | |
| Titanium dioxide | 20.47 |
| White pigment sold under the trademark of MICROWHITE 25 by Sylacauga Calcium Products Co. | 4.65 |
| Propylene glycol | 5.45 |
| Defoamer sold under the trademark BALAB 748 by Dow Chemical Co. | 0.37 |
| Water | 0.19 |
| Anionic dispersing agent sold under the trademark of TAMOL 850 by Rohm & Haas Co. | 0.92 |
| Phenyl mercury acetate fungicide sold under the trademark of PMA-100 by Tenneco Chemical Inc. | 0.02 |
| Coalescing | |
| Propylene glycol | 8.56 |
| Ethylene glycol monobutyl- ether sold under the trademark BUTYLCELLOSOLVE by Union Carbide Corp. | 2.28 |
| Water | 6.98 |
| Ethylene glycol monomethyl ether sold under the trademark of CELLOSOLVE QT-15,00 by Union Carbide Corp. | 0.19 |
| Nonionic surfactant sold under the trademark of TRITON X-207 by Rohm & Haas Co. | 0.57 |
| Nonionic surfactant sold under the trademark of TRITON N-57 by Rohm & Haas Co. | 0.40 |
| Vehicle | |
| Acrylic latex emulsion sold under the trademark of AC-490 by Rhm & Haas Co. | 48.95 |

The improved latex paint was formulated by admixing 95 parts by weight of the above semi-gloss acrylic latex paint with 5 parts by weight of the polyethylene emulsion produced in accordance with Example XII. Standard tests of scrub resistance, color acceptance and development, flow, leveling and brushing were conducted with the improved paint containing the polyethylene emulsion and compared to the paint which did not contain the polyethylene emulsion. It was found that the improved paint containing the polyethylene emulsion exhibited improved scrub resistance, color acceptance and development, flow, leveling and brushing over that of the standard acrylic latex paint without the polyethylene emulsion. In addition it was found that the gloss of the standard paint formulation was not effected.

EXAMPLE XIV

The polyethylene emulsion as produced in Example V was formulated in a translucent floor polish as shown in Table 2 below. The floor polish had a pH of 9.0 and a total solids of 15 weight percent.

Table 2

| Component | Translucent Floor Polish Composition Parts By Weight |
|---|---|
| An acrylic dispersion (at 15 weight percent solids) sold under the trademark PHOPLEX B-505 by Rohm & Haas Company | 90.0 |
| The polyethylene emulsion produced in accordance with Example V (at 15 weight percent solids) | 10.0 |
| Tributyloxyethyl phosphate | 1.0 |
| Diethylene glycol monobutylether | 3.0 |
| Ethylene glycol | 0.5 |
| Fluorocarbon sold under the trademark of FC-128 by Minnesota Mining & Mfg. Co. (at 1 weight percent solids) | 0.5 |

The above translucent floor polish formulation was evaluated against similar formulations that did not contain the polyethylene emulsions by standard tests. The polish containing the polyethylene emulsion was found to have improve scuff and scratch resistance, slip resistance, gloss, black heel mark resistance, durability and stability and still had approximately the same detergent resistance and removability as the basic polish formulation.

While this invention had been described in relation to its preferred embodiments, it is to be understood that various modifications thereof will be apparent to those skilled in the art upon a study of this specification, and it is intended to cover such modifications as fall within the scope of the appended claims.

We claim:

1. A process for preparing translucent ethylene polymer emulsions comprising polymerizing ethylene under a pressure of from about 1,400 to about 20,000 psi by contacting gaseous ethylene with an aqueous medium having a pH of from about 8.5 to about 14.0 at a temperature of from about 60° C to about 150° C, said aqueous medium containing a water soluble salt of persulfuric acid as initiator in an amount effective to initiate polymerization, an effective amount of an emulsifier which is below about 9% by weight of said aqueous medium, which emulsifier is selected from the group consisting of anionic emulsifiers, nonionic emulsifiers and mixtures thereof, and from about 0.1 to about 1% by weight of said aqueous medium of a mercaptan selected from the group consisting of alkyl mercaptans having from about 4 to about 20 carbon atoms, dithiobis(benzothiazole), benzyl mercaptan, and p-chlorobenzyl mercaptan to thereby form said aqueous emulsion of ethylene polymer particles having molecular weights in the range of from about 3,000 to 15,000 and average particle sizes between 100 and 500 angstroms.

2. The process of claim 1 wherein said anionic emulsifiers are selected from the group consisting of alkali metal salts of alkyl aryl sulfonates, salts of saturated fatty acids having from about 12 to about 18 carbon atoms, salts of sulfates of saturated fatty alcohols having from about 12 to about 18 carbon atoms, and salts of sulfates of ethoxylated saturated fatty alcohols having from about 12 to about 18 carbon atoms and an average number of ethoxy groups between 1 and 5.

3. The process of claim 2 wherein said nonionic emulsifiers are selected from alkyl phenoxy polyoxyethylene ethanols.

4. The process of claim 3 wherein said emulsifier is an alkali metal salt of an alkyl benzene sulfonic acid wherein the alkyl group has from about 6 to about 18 carbon atoms.

5. The process of claim 4 wherein said initiator is present in an amount ranging from about 0.1 to about 0.75 percent by weight of said aqueous medium and said emulsifier is present in an amount ranging from about 1 to about 7% by weight of said aqueous medium.

6. The process of claim 3 wherein said initiator is present in an amount in the range of from about 0.08 to about 0.5% by weight of said aqueous medium and said emulsifier present in an amount in the range of from about 1 to about 5 percent by weight of said aqueous medium.

7. The process of claim 3 wherein said emulsifier is a member selected from a group consisting of (1) a salt of a saturated fatty acid having from about 12 to about 18 carbon atoms, (2) a salt of a sulfate of a saturated fatty alcohol having about 12 to 18 carbon atoms, and (3) a salt of a sulfate of an ethoxylated saturated fatty alcohol having about 12 to about 18 carbon atoms and an average number of ethoxy groups between 1 and 5.

8. The process of claim 7 wherein said initiator is present in an amount in the range of from about 0.06 to about 0.75% by weight of said medium and said emulsifier is present in an amount in the range of from about 0.9 to about 9% by weight of said aqueous medium.

9. The process of claim 3 wherein said emulsifier is a mixture of an anionic emulsifier selected from said anionic emulsifiers, and said nonionic emulsifiers which mixture comprises from about 5 to about 75 weight percent thereof of said nonionic emulsifier.

10. The process of claim 9 wherein said initiator is present in an amount in the range of from about 0.06 to 0.75% by weight of said aqueous medium and said emulsifier mixture is present in an amount in the range of from about 1.0 to 9.0 weight percent of said aqueous emulsion.

11. The product produced by the process of claim 1.

12. The process of claim 3 further comprising contacting said ethylene with another alpha unsaturated monomer in said aqueous solution to form an ethylene copolymer emulsion.

13. The process of claim 12 wherein said alpha unsaturated monomer comprises up to about 25% by weight of said copolymer in said emulsion.

14. The process of claim 13 wherein said alpha unsaturated monomer is selected from the group consisting of alkyl vinyl compounds having from about 3 to about 24 carbon atoms, vinyl organic acids, alkyl acrylate esters, styrene and substituted styrenes, disubstituted olefins, vinyl esters, and mixtures thereof.

15. The process of claim 1 wherein said mercaptan is an alkyl mercaptan having from about 4 to about 20 carbon atoms.

16. In the method of preparing a stable translucent aqueous emulsion of ethylene polymer which includes polymerizing ethylene homopolymers or copolymers in an aqueous medium containing dissolved therein a water soluble persulfate polymerization initiator and an emulsifying agent selected from the group consisting of anionic emulsifiers, nonionic emulsifiers and mixtures thereof, the improvement comprising dissolving from about 0.1 to about 1% by weight of a mercaptan selected from the group consisting of alkyl mercaptans having from about 4 to about 20 carbon atoms, dithiobis (benzothiazole), and p-chlorobenzyl mercaptan in said aqueous medium prior to said polymerizing to thereby form an emulsion containing polymer particles of controlled molecular weight and having a particle size between 100 and 500 angstrom units.

17. The method of claim 16 wherein said anionic emulsifiers are selected from the group consisting of alkali metal salts of alkyl aryl sulfonates, salts of saturated fatty acids having from about 12 to about 18 carbon atoms, salts of sulfates of saturated fatty alcohols having from about 12 to about 18 carbon atoms and salts of sulfates of ethoxylated saturated fatty alcohols having from about 12 to about 18 carbon atoms and an average number of ethoxy groups between about 1 and about 5.

18. The method of claim 16 wherein said mercaptan is an alkyl mercaptan having from about 4 to about 20 carbon atoms.

19. A stable translucent polymeric emulsion compatible for blending with aqueous latex compositions comprising a plurality of emulsified solid particles, emulsion polymerized in the presence of a persulfate cataylst and an effective amount of a mercaptan selected from a group consisting of alkyl mercaptans having from about 4 to about 20 carbon atoms, dithiobis (benzothiazole), benzyl mercaptan and p-chlorobenzyl mercaptan, at a temperature of from about 60° to about 150° C and the pressure of from about 1,400 psi to about 20,000 psi, said particles selected from homopolymers and copolymers of ethylene having a molecular weight in the range of from about 3,000 to about 15,000 and an average particle size between 100 and 500 angstrom units and being suspended in an aqueous medium comprising water and a minor effective amount of an emulsifier selected from the group consisting of anionic emulsifiers, nonionic emulsifiers and mixtures thereof.

20. The emulsions of claim 19 wherein said anionic emulsifiers are selected from the group consisting of alkali metal salts of alkyl aryl sulfonates, salts of saturated fatty acids having from about 12 to about 18 carbon atoms, salts of sulfates of saturated fatty alcohols having from about 12 to about 18 carbon atoms, and salts of sulfates of ethoxylated saturated fatty alcohols having from about 12 to 18 carbon atoms and an average number of ethoxy groups between 1 and 5.

21. The polymeric emulsion of claim 20 wherein said nonionic emulsifiers are selected from alkyl phenoxy polyoxyethylene ethanols.

22. The emulsion of claim 21 wherein said emulsifier is a mixture of said anionic and said nonionic emulsifer which contains from about 5 to about 75 % by weight of said nonionic emulsifier.

23. The emulsion of claim 21 wherein said solid particles are hompolymers of ethylene.

24. The emulsion of claim 21 wherein said solid particles are copolymers of ethylene.

25. The emulsion of claim 24 wherein said polymer comprises ethylene polymerized with up to about 25percent by weight of an alpha unsaturated monomer.

26. The emulsion of claim 25 wherein said alpha unsaturated monomer is selected from the group consisting of alkyl vinyl compounds having from about 3 to about 24 carbon atoms, vinyl organic acids, alkyl acrylate esters, styrene and substituted styrenes, disubstituted olefins, vinyl esters, and mixtures thereof.

27. The stable polymeric emulsion of claim 19 wherein the mercaptan present is an alkyl mercaptan having from about 4 to about 20 carbon atoms.

* * * * *